United States Patent
Munro et al.

(10) Patent No.: US 8,050,411 B2
(45) Date of Patent: Nov. 1, 2011

(54) METHOD OF MANAGING ONE-TIME PAD DATA AND DEVICE IMPLEMENTING THIS METHOD

(75) Inventors: William John Munro, Stoke Gifford Bristol (GB); Timothy Paul Spiller, Stoke Gifford Bristol (GB); Martin Sadler, Stoke Gifford Bristol (GB); Christopher Tofts, Stoke Gifford Bristol (GB); Keith Alexander Harrison, Stoke Gifford Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 996 days.

(21) Appl. No.: 11/489,750

(22) Filed: Jul. 17, 2006

(65) Prior Publication Data

US 2007/0172054 A1   Jul. 26, 2007

(30) Foreign Application Priority Data

Sep. 29, 2005   (GB) .................................. 0519842.9
Oct. 31, 2005   (GB) .................................. 0522141.1

(51) Int. Cl.
*H04L 9/00*   (2006.01)

(52) U.S. Cl. ........................................ 380/279; 713/171
(58) Field of Classification Search .................... 380/28, 380/277–279; 713/171
See application file for complete search history.

(56) References Cited

U.S. PATENT DOCUMENTS

| | | | |
|---|---|---|---|
| 5,266,942 A * | 11/1993 | Stoller ......................... | 340/5.74 |
| 6,021,203 A * | 2/2000 | Douceur et al. .............. | 380/252 |
| 6,364,834 B1 * | 4/2002 | Reuss et al. ................... | 600/300 |
| 6,748,083 B2 * | 6/2004 | Hughes et al. ................ | 380/278 |
| 2002/0133533 A1 * | 9/2002 | Czajkowski et al. ......... | 709/107 |
| 2003/0016821 A1 | 1/2003 | Hammersmith ................ | 380/37 |
| 2004/0247130 A1 * | 12/2004 | Koike ............................ | 380/277 |
| 2009/0207734 A1 * | 8/2009 | Stultz et al. ................... | 370/235 |

* cited by examiner

*Primary Examiner* — Nasser Moazzami
*Assistant Examiner* — Lisa Lewis (57) ABSTRACT

A device stores one-time pad data for use in carrying out various tasks. In order to preserve the ability to carry out important tasks that require the use of one-time data, use of the one-time pad data held by the device is controlled such that an amount of this one-time pad data is only usable by a predetermined set of important tasks comprising at least a replenishment task for replenishing the device with one-time pad data.

16 Claims, 4 Drawing Sheets

METHOD OF MANAGING ONE-TIME PAD DATA AND DEVICE IMPLEMENTING THIS METHOD

FIELD OF THE INVENTION

The present invention relates to a method of managing one-time pad data and a device for implementing this method.

BACKGROUND OF THE INVENTION

As is well known, two parties that posses the same secret random data can provably achieve both unbreakable secure communication using the Vernam cipher, and discrimination between legitimate messages and false or altered ones (using, for example, Wegman-Carter authentication). In both cases, however, data used from the secret random data shared by the parties must not be re-used. The term "one-time pad" is therefore frequently used to refer to the secret random data shared by the parties and this term, or its acronym "OTP", is used herein for secret random data shared by more than one party. Although for absolute security the one-time pad data must be truly random, references to one-time pads (OTP) herein includes secret data that may not be truly random but is sufficiently random as to provide an acceptable degree of security for the purposes concerned.

The fact that the OTP data is effectively consumed when used gives rise to a major drawback of the employment of OTP cryptographic systems, namely that the OTP must be replenished.

One approach to sharing new OTP data between two parties is for one party to generate the new OTP data and then have a copy of the data physical transported in a storage medium to the other party. This is costly to do, particularly where it needs to be done frequently; furthermore, it may not be feasible to adopt this approach (for example, where one of the parties is a communications satellite).

Another approach is to send the OTP data over a communications link encrypted using a mathematically-based encryption scheme. However, this approach effectively reduces the security level to that of the encryption scheme used; since no such schemes are provable secure and may well prove susceptible to attack as a result of advances in quantum computing, this approach is no better than replacing the intended OTP system with a mathematically-based scheme.

More recently, quantum key distribution (QKD) methods and systems have been developed which enable two parties to share random data in a way that has a very high probability of detecting any eavesdroppers. This means that if no eavesdroppers are detected, the parties can have a high degree of confidence that the shared random data is secret. QKD methods and systems are described, for example, in U.S. Pat. No. 5,515,438 and U.S. Pat. No. 5,999,285. In known QKD systems, randomly polarized photons are sent from a transmitting apparatus to a receiving apparatus either through a fiber-optic cable or free space.

As a consequence of the actual and perceived problems of sharing secret random data, OTP cryptographic systems have generally only been used in applications where the security requirements are paramount such as certain military and government applications.

Because OTP cryptography is generally only employed where very high security is needed, the types of system where it is used are those where other components of the overall system do not significantly compromise the level of security provided by OTP cryptography. In particular, there is little point in using OTP cryptography for passing secret messages between parties if the messages are to be stored or subsequently transmitted in a manner that is significantly less secure. Furthermore, the storage of the OTP data itself represents a security threat and unless the OTP data can be stored in a highly secure manner, it is better to share OTP data only at a time immediately before it is to be consumed.

SUMMARY OF THE INVENTION

According to a first aspect of the present invention, there is provided a method of managing one-time pad data stored in a device that is arranged to carry out one or more security-related tasks using the one-time pad data, the method comprising controlling use of the one-time pad data held by the device such that an amount of this one-time pad data is only usable by a predetermined set of important tasks comprising at least a replenishment task for replenishing the device with one-time pad data.

According to a second aspect of the present invention, there is provided A device comprising:
  a memory for holding one-time pad data,
  a consumption arrangement for using one-time pad data from the memory to carry out one or more security-related tasks;
  a provisioning arrangement for carrying out a replenishment task to replenish the memory with one-time pad data, the replenishment task itself using of one-time pad data from the memory, and
  a one-time pad data manager for reserving an amount of the one-time pad data held in the memory for use by a set of important tasks comprising at least the replenishment task.

BRIEF DESCRIPTION OF THE DRAWINGS

Embodiments of the invention will now be described, by way of non-limiting example, with reference to the accompanying diagrammatic drawings of embodiments of the invention, in which.

BEST MODE OF CARRYING OUT THE INVENTION

Figure 1:
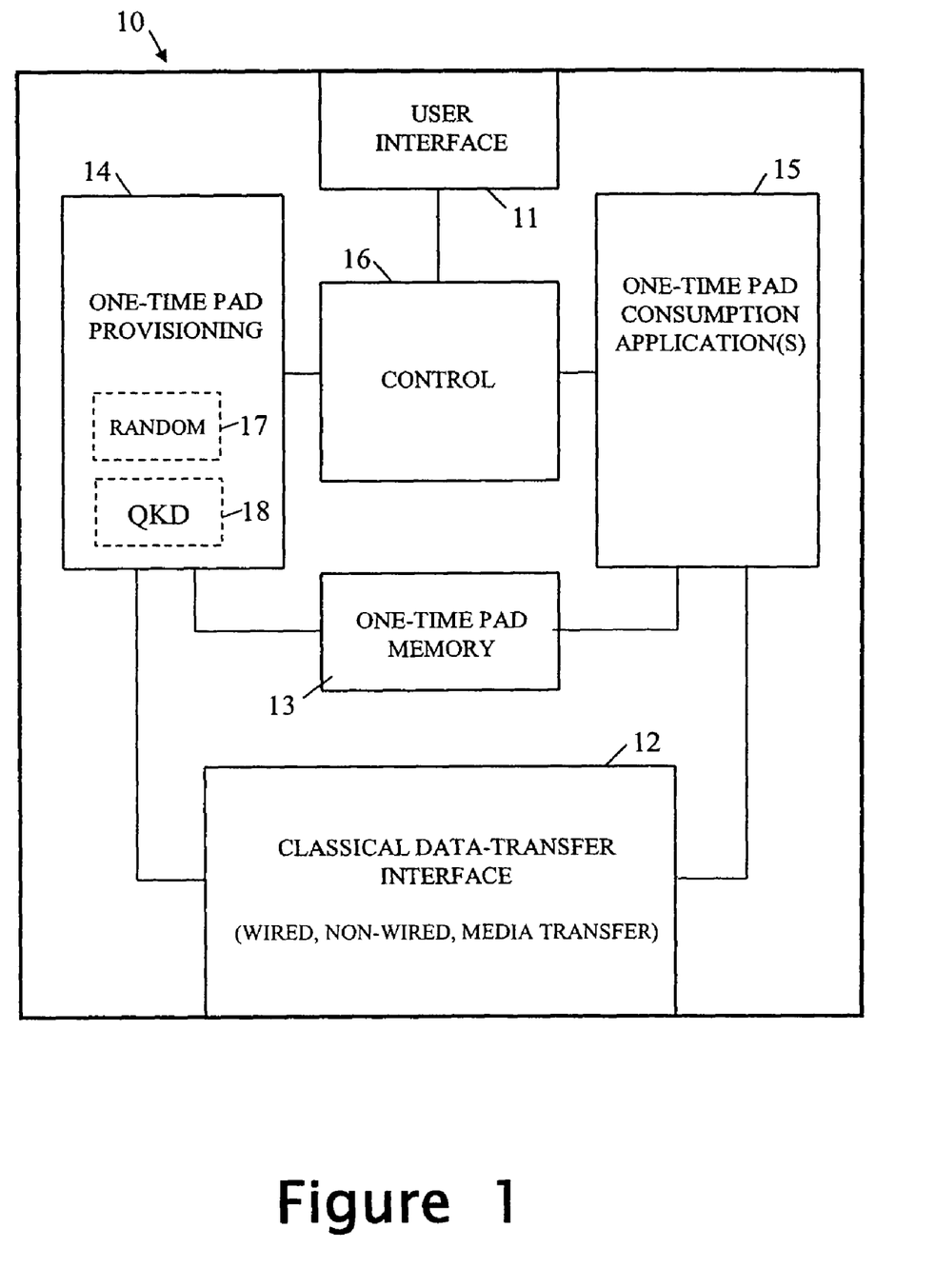
FIG. 1 is a diagram of a generalised form of user OTP device used in embodiments of the invention.

FIG. 1 shows, in generalized form, a user OTP device 10 for storing and using one-time pad data for various applications such as, for example, encryption and identification. Preferred embodiments of the device 10 are portable in form and are, for example, constituted by hand-held devices such as mobile phones and PDAs; however, other embodiments of the apparatus 10 can be of non-portable form such as a personal desktop computer.

In use, the OTP device 10 is intended to communicate with OTP apparatus having access to the same secret random data as the device 10 in order to conduct an OTP interaction (that is, an interaction requiring use of the same OTP data by the device and apparatus). Such OTP apparatus is hereinafter referred to as the "complementary OTP apparatus" with respect to the device 10; this apparatus can be of the same general form as the user OTP device 10 or can be of a different form and/or form part of a distributed system as will be described more fully hereinafter. Generally, the complementary OTP apparatus will be shown with a circular boundary in the Figures and will be referenced '20'.

The User OTP Device 10

The user OTP device 10 comprises the following functional blocks:

- a user interface block 11 for interfacing with a user;
- a classical data-transfer interface 12 for transferring data to and/or from external entities by wired or non-wired means, or by media transfer;
- a memory 13 for storing OTP data;
- an OTP provisioning block 14 which, through interaction with an external entity, is arranged to provide new secret random data for initializing or replenishing the memory 13 with OTP data;
- an OTP consumption block 15 for carrying out one or more applications that consume OTP data stored in memory 13; and
- a control block 16 for controlling and coordinating the operation of the other blocks in response to inputs received through the user interface 11 and the data-transfer interface 12.

Typically, the functional blocks 11 to 16 are implemented using a program-controlled processor together with appropriate specialized sub-systems. Further details of each block are given below for the case where a processor-based system (including a main processor and associated memory) is used to carry out at least most of the data processing tasks of the device 10, such tasks including, in particular, the control and coordination tasks of control block 16 and the running of the security applications embodying the OTP consumption block 15.

User Interface 11

The user interface 11 typically comprises an LCD display and an input keypad but may also include audio input and/or output means.

Classical Data-Transfer Interface 12

The classical data-transfer interface 12 can comprise a non-wired interface such as a Bluetooth (Trademark) wireless interface or an IrDA infrared interface; however, a wired interface can alternatively or additionally be provided such as an USB interface (as used herein, the term "wired" is to be understood broadly to cover any type of interface that requires electrical elements to be brought into physical contact). For circumstances where transit delay is not an issue, it is also possible to implement the data-transfer interface 12 as a removable storage medium and related read/write arrangement.

OTP Memory 13

The OTP memory 13 can be part of the general memory associated with the main processor of device 10 or can be formed by a separate memory. In either case, the OTP data is preferably secured against unauthorized access by one or more appropriate technologies. For example, the memory 13 can all be provided in a tamper-resistant hardware package. Alternatively, a protected storage mechanism can be used in which all but the root of a hierarchy (tree) of encrypted data objects is stored in ordinary memory, the root of the hierarchy being a storage root key which is stored in a tamper-resistant hardware package and is needed to decrypt any of the other data objects of the hierarchy. Furthermore, trusted platform techniques can be used to ensure that only authorized software can access the OTP data. It is also possible to use QRAM (Quantum RAM) technologies.

Where the device 10 is designed such that OTP data is consumed immediately following its provisioning, the security requirements of memory 13 can be reduced (unless the device 10 is designed to operate unattended).

OTP Provisioning Block 14

With regard to the OTP provisioning block 14, the most secure way to share secret random data is to use a quantum key distribution method such as described in the documents referenced in the introduction to the present specification. In this case, the OTP provisioning block is provided with a QKD subsystem 17 that can be either a QKD transmitter or a QKD receiver. It is relatively straightforward to incorporate a QKD transmitter within a hand-held device and then to provide a cradle or similar mechanical arrangement to ensure that the device is properly optically aligned to interact with a fixed QKD receiver subsystem. In fact, it is possible to dispense with a mechanical alignment arrangement by the use of an automated or semi-automated alignment system such as is disclosed in our co-pending U.S. patent application Ser. No. 11/454,624, filed 16 Jun. 2006.

Figures 2A, 2B:
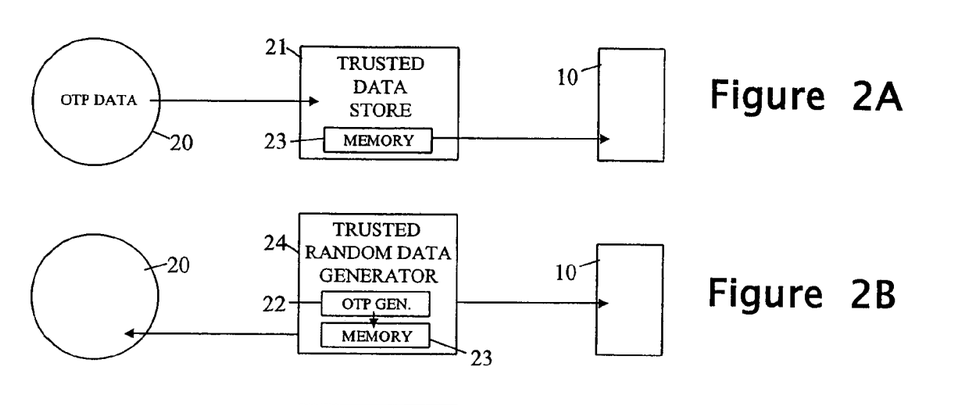
FIG. 2A is a diagram illustrating the use of a trusted data store to transfer OTP data.
FIG. 2B is a diagram illustrating the use of a first form of trusted random data generator to generate and distribute OTP data.

The OTP provisioning block 14 need not be built around a QKD subsystem and a number of alternative embodiments are possible. Thus, in one such alternative embodiment the OTP provisioning block 14 is simply be arranged to store to the OTP memory 13, secret random data received via the data-transfer interface 12 from either:

(i) OTP apparatus seeking to share secret random data with the device 10 either directly or via a trusted data store;

(ii) a trusted random data generator that has the role of generating secret random data and passing it both to the user device 10 and to OTP apparatus with which the device 10 is wishing to interact using shared OTP data FIG. 2A illustrates the use of a trusted data store 21 for transferring secret random data to the device 10. In FIG. 2A, secret random data provided by the complementary OTP apparatus 20 is first passed to the trusted data store where it is held in memory 23 before being subsequently transferred to the OTP device 10. The trusted data store 21 can be infrastructure equipment or stand-alone equipment such as a hand-held device.

FIG. 2B illustrates the use of a trusted random data generator 24. The trusted generator 24 includes a random data generation arrangement 22 for generating the random data, this data being generated at a time that the trusted random data generator 24 is in communication with the device 10 so that the random data can be passed immediately to the device 10. The trusted random data generator 24 also stores the random data it has generated in memory 23 and subsequently transfers this data to the complementary OTP apparatus 20. It will be appreciated that the random data could have been generated when the generator 24 was in communication with the apparatus 20 and then subsequently passed by the generator 24 to the device 10. It would also be possible for the generator 24 to only generate random data when in communication both the device 10 and apparatus 20 so that the random data is passed to both immediately, obviating the need for the memory 23. Conversely, the random data could be generated in advance of the trusted random data generator 24 being in communication with either of the device 10 and apparatus 20 in which case the random data is stored in memory 23 and subsequently passed to each of the device 10 and apparatus.

Figure 2C:
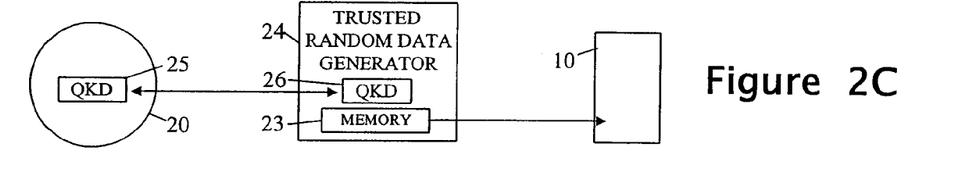
FIG. 2C is a diagram illustrating the use of a second form of trusted random data generator to generate and distribute OTP data.

In the FIG. 2B form of the trusted random data generator 24, the random data is generated by the generator 24 acting alone. FIG. 2C shows a different form of the trusted random data generator 24 in which a QKD arrangement is used to generate the OTP data—in the illustrated scenario, the trusted random data generator 24 includes a QKD transmitter 26 arranged to interact with a QKD receiver 25 in the apparatus 20 in order to generate secret random data. The QKD transmitter 26 and receiver 25 can, of course, be swapped around; furthermore, the OTP data could alternatively be generated by a QKD interaction between the trusted generator 24 and a QKD entity in the device 10. As with the FIG. 2B trusted random data generator 24, the generator 24 of FIG. 2C also includes a memory 23 for storing the generated random data prior to transfer to the device 10 (or to the apparatus 20 if the QKD interaction was with the device 10).

The trusted random data generator 24 can be totally independent of the OTP device 10 and OTP apparatus 20 or can be associated with one of these entities—for example, the trusted random data generator 24 can be run by a bank that also runs the OTP apparatus 20.

Returning now to a consideration of the provisioning block 14 of the device 10, rather than the secret random data being generated using a QKD subsystem or being received by the provisioning block 14 from an external source, the OTP provisioning block 14 can include a random data generator 17 for generating random data which is both used to provision the memory 13 with OTP data, and passed via the data-transfer interface 12 directly or indirectly (including via a trusted data store) to other OTP apparatus with which the device 10 wishes to conduct OTP interactions. The random data generator is, for example, a quantum-based arrangement in which a half-silvered mirror is used to pass/deflect photons to detectors to correspondingly generate a "0"/"1" with a 50:50 chance; an alternative embodiment can be constructed based around overdriving a resistor or diode to take advantage of the electron noise to trigger a random event. Other techniques can be used for generating random data, particularly where a reduced level of security is acceptable—in such cases, some relaxation can be permitted on the randomness of the data allowing the use of pseudo random binary sequence generators which are well known in the art.

Where the secret random data is being received or being passed on via the classical data-transfer interface 12, it is highly desirable for the data to be encrypted (except possibly where a wired interface is being used to interface directly with OTP apparatus or a trusted data store). The encryption should not, of course, be based on the Vernam cipher using existing OTP data from the memory 13 since in this case as least as much OTP data would be consumed as newly provisioned; however the existing OTP data can be used to form a session key for the (relatively) secure transfer of the new secret random data.

It will be appreciated that the level of security that applies to the sharing of secret random data between the device 10 and other OTP apparatus sets the maximum level of security that can be achieved using a one-time pad formed from this data; accordingly, if the user of the device 10 wishes to use the OTP data held in the device 10 to achieve very high levels of security for data transfer from the device, then the initial sharing of the secret random data must involve corresponding levels of security; however, if the OTP data is only to be used for applications that do not warrant the highest levels of security, then the security surrounding secret random data sharing can be relaxed.

It will also be appreciated that the sharing of the secret random data used for the one-time pads is generally restricted to entities that know something about each other (such as their respective identities or some other attribute); accordingly, the sharing of the secret random data will normally be preceded by a verification or qualification process during which each entity satisfies itself that the other entity possesses appropriate attributes. This applies not only for the OTP device 10 and the complementary OTP apparatus 20, but also to the trusted data store 21 and the trusted random data generator 24 which should check the attributes of any entity purporting to entitled to receive OTP data before such data is passed on to that entity.

The provisioning block 14 can simply append newly-obtained secret random data to the existing OTP data in memory 13 or can combine the new secret random data with the existing OTP data using a merge function, the merged data then replacing the previous contents of the memory 13. Preferably, the merge function is such that an eavesdropper who has somehow managed to obtain knowledge of the new secret random data, cannot derive any part of the merged data without also having knowledge of the pre-existing OTP data in the memory 13. A wide range of possible merge functions exist including functions for encrypting the new secret random data using the existing OTP data for the encrypting key, and random permutation functions (it will be appreciated that whatever merge function is used, it must be possible for the complementary OTP apparatus to select and use the same function on its copy of the new secret random data and its existing OTP data). Merging of the new secret random data and existing OTP data otherwise than by aggregation, can only be done if the device 10 and the complementary OTP apparatus have the same existing OTP data which should therefore be confirmed between the device and apparatus before the new secret random data and existing OTP data are subject to merging. In this respect, it will be appreciated that the OTP device 10 and the complementary OTP apparatus may not have the same existing OTP data for a variety of reasons such as a failed communication between the device and apparatus resulting in one of them consuming OTP data but not the other. Of course, it will frequently be possible for the OTP device and the complementary OTP apparatus to cooperate such that if either of them still has OTP data already discarded by the other, then that entity also discards the same data (one method of doing this is described later). However, it will not always be possible for the device 10 and the complementary OTP apparatus to cooperate in this way, or even check whether they have the same existing OTP data, at the time that one or other of the device and apparatus is provided with new secret random data—for example, if the OTP device is being replenished with new secret random data by communication with a trusted random data generator, it may well be that the trusted random data generator is not concurrently in communication with the OTP apparatus, the new secret random data only being subsequently shared with the OTP apparatus. In this type of situation, the new secret random data must be appended to the existing OTP data rather than being merged with it.

OTP Consumption Block 15

The OTP consumption block 15 is arranged to carry out tasks ('applications') that require the use ('consumption') of OTP data from the memory 13; it is to be understood that, unless otherwise stated herein, whenever data is used from the OTP data held in memory 13, that data is discarded. As already indicated, the OTP consumption block 15 is preferably provided by arranging for the main processor of the device 10 to execute OTP application programs; however, the consumption block 15 can additionally/alternatively comprise specialized hardware processing elements particularly where the OTP application to be executed involves complex processing or calls for high throughput.

A typical OTP consumption application is the generation of a session key for the exchange of encrypted messages with the complementary OTP apparatus; in this case, the complementary OTP apparatus can generate the same session key itself. Of course, the device 10 can securely communicate with the complementary OTP apparatus by encrypting data to be sent using the Vernam cipher—however, this would require the use of as much OTP data as there was data to be exchanged and so give rise to rapid consumption of the OTP data from memory 13.

Another OTP consumption application is the evidencing that the device 10 (or its owner/user) possesses a particular attribute. As already noted, the distribution of the secret random data used for the one-time pads is generally restricted to entities that know something about each other, such as their respective identities or the possession of other particular attributes (in the present specification, reference to attributes possessed by an entity includes attributes of a user/owner of the entity). An example non-identity attribute is an access authorisation attribute obtained following a qualification process that may involve the making of a payment. The secret random data will only be shared after each entity (or a trusted intermediary) has carried out some verification/qualification process in respect of the identity or other attributes of the other entity concerned. This verification/qualification can simply be by context (a bank customer replenishing their device 10 from an OTP apparatus within a bank may be willing to accept that the secret random data being received is shared only with the bank); however, verification/qualification can involve checking of documentary evidence (for example, a paper passport), or an automatic process such as one based on public/private keys and a public key infrastructure. Whatever verification/qualification process is used to control the sharing of secret random data, once such sharing has taken place, OTP data based on the secret random data can be used to prove the identity or other attributes of the possessor of the OTP data. Thus, for example, if OTP apparatus knows that it shares OTP data with an OTP device 10 with identity "X", then the device 10 can identify itself to the complementary OTP apparatus by sending it a data block from the top of its one-time pad; the apparatus then searches for this data block in the one or more OTP pads it possesses and if a match is found, it knows that it is communicating with entity "X". To aid finding a match, the device 10 preferably sends the OTP apparatus an identifier of the one-time pad that the device is proposing to use.

As already noted, communication failures and other issues can result in different amounts of OTP data being held by the OTP device 10 and the complementary OTP apparatus; more particularly, the data at the top of the one-time pad held by device 10 can differ from the data at the top of the one-time pad held by the complementary OTP apparatus. This is referred to herein as "misalignment" of the one-time pads. It is therefore convenient for the OTP device and the complementary OTP apparatus to each obtain or maintain a measure indicating how far it has progressed through its OTP data; this measure can also be thought of as a pointer or index to the head of the OTP pad and is therefore referred to below as the "head index". Preferably, the head index is taken as the remaining size of the OTP data; although other measurements can be used for the head index (such as how much OTP data has been used), measuring the remaining size of the OTP data can be done at any time and so does not require any on-going maintenance. Whatever actual numeric value of the measure used for the head index, in the present specification the convention is used, when discussing head index values, that the nearer the top of the one-time pad is to the bottom of the pad, the "lower" is the value of the head index.

The head index is used to correct for misalignment of the one time pads held by the device 10A and the complementary OTP apparatus as follows. At the start of any OTP interaction, the device 10 and complementary OTP apparatus exchange their head indexes and one of them then discards data from the top of its one-time pad until its head index matches that received from the other—that is, until the one-time pads are back in alignment at the lowest of the exchanged head index values. When OTP data is used by the device or apparatus in conducting the OTP transaction, the head index is sent along with the OTP interaction data (e.g. an OTP encrypted message) to enable the recipient to go directly to the correct OTP data in its one-time pad; this step can be omitted since although the one-time pads may have become misaligned by the time a message with OTP interaction data successfully passes in one direction or the other between the device and apparatus, this misalignment is likely to be small and a trial-and-error process can be used to find the correct OTP data at the receiving end.

The Complementary OTP Apparatus

With regard to the complementary OTP apparatus with which the OTP device 10 shares the same OTP data and can therefore conduct an OTP-based interaction, this can be constituted by apparatus in which all three functions of OTP storage, provisioning, and consumption are contained within the same item of equipment (as with the device 10); such OTP apparatus is referred to herein as "self-contained" OTP apparatus. However, it is also possible for the complementary OTP apparatus to be distributed in form with one of the OTP storage, provisioning, and consumption functions being in a separate item of equipment from the other two, or with all three functions in separate items of equipment to the OTP storage and provisioning functions; such OTP apparatus is referred to herein as "distributed" OTP apparatus. In distributed OTP apparatus it is, of course, necessary to ensure an adequate level of security for passing OTP data between its distributed functions. It is conceivable that one or both of the provisioning and consumption functions are provided by equipment that is also used by another distributed OTP apparatus.

Figure 3:
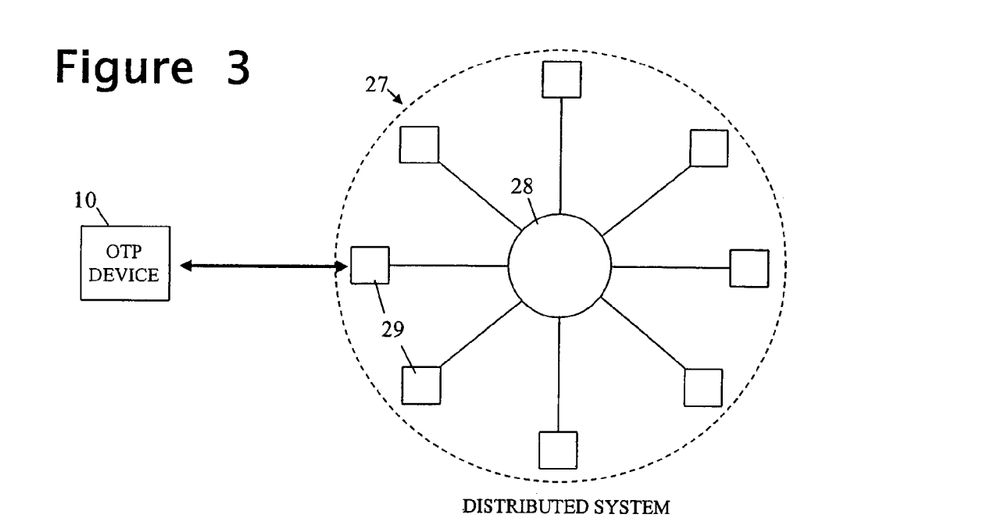
FIG. 3 is a diagram depicting a user OTP device interacting with a distributed data processing system.

To illustrate the different roles that self-contained and distributed OTP apparatus can play, FIG. 3 shows the OTP device 10 conducting an OTP interaction with a distributed data processing system 27 such as a banking system. The distributed system 27 comprises a central computer facility 28 that communicates with a plurality of customer-interfacing units 29 by any suitable communications network. The device 10 can communicate with one or more of the units 29 using its classical data-transfer interface 12.

In one possible scenario, each of the units 29 is a self-contained OTP apparatus holding OTP data that is distinct from the OTP data held by any other unit 29; in this case, assuming that the device 10 only holds one pad of OTP data, it is restricted to interacting with the unit 29 that holds the same pad. Alternatively, the OTP device 10 can be arranged to hold multiple pads of OTP data each corresponding to a pad held by a respective one of the units 29, the device 10 then needing to use data from the correct pad for the unit 29 with which it wishes to conduct an OTP interaction.

In an alternative scenario, the central computer facility 28 is a self-contained OTP apparatus, the device 10 conducting the OTP interaction with the facility 28; in this case, each of the units 29 is simply a communications relay for passing on the OTP interaction messages.

In a further alternative scenario, the central computer facility 28 holds the OTP data shared with the device 10 but the units 29 are consumers of that data; in this case, the device 10 conducts the OTP interaction with one of the units, the unit obtaining the needed OTP data from the facility 28 over the internal network of the distributed system. In this scenario, the distributed system 27 forms a distributed OTP apparatus.

It may be noted that in the last scenario, it is possible to arrange for each of the units 29 to be capable of taking part in an OTP provisioning operation with the device 10, either by passing on to the central computer facility 28 secret random data provided by the device 10, or by generating random data and passing it both to the device 10 and to the central facility 28; in this latter case, the units 29 independently generate their random data.

Whatever the form of the complementary OTP apparatus, it may have been designed to carry out OTP interactions with multiple different devices 10, each with its own OTP data. This requires that the complementary OTP apparatus hold multiple different pads of OTP data, one for each device 10 with which it is to conduct OTP interactions; it also requires that the OTP apparatus uses the correct OTP data when interacting with a particular OTP device 10. One way of enabling the OTP apparatus to determine quickly which is the correct pad of OTP data to use in respect of a particular device 10, is for each pad to have a unique identifier which the device sends to the apparatus when an OTP interaction is to be conducted. It is not necessary for this identifier to be sent securely by the device 10 (unless there are concerns about an eavesdropper tracking patterns of contact between particular devices and the apparatus).

Managing One-Time Pad Consumption

Figure 4:
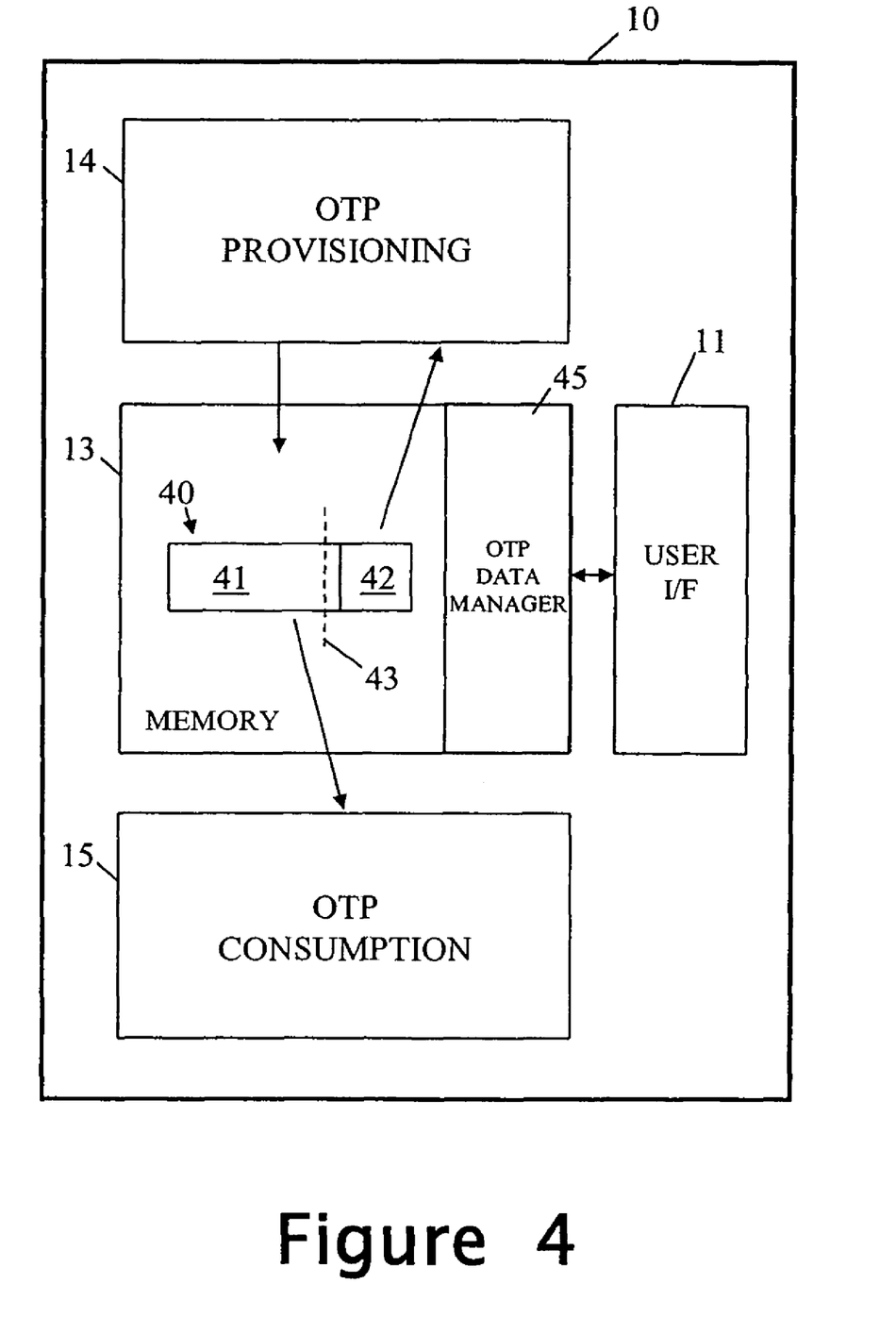
FIG. 4 is a diagram of an implementation of the FIG. 1 device in which OTP data is reserved for carrying out OTP data replenishment.

FIG. 4 depicts a form of the device 10 that consumes OTP data as part of the OTP replenishment task carried out by provisioning block 14 (as well as when the OTP consumption block 15 conducts OTP application interactions with the complementary OTP apparatus). It should be noted that in FIG. 4, certain of the functional blocks of device 10 have not been shown for reasons of clarity.

The OTP provisioning block 14 may use OTP data in a number of ways depending on how it is arranged to share OTP data. For example, the provisioning block 14 can be arranged to receive/transmit new secret random data over a wireless link provided by the classical data-transfer interface 12 where the new secret random data has been encrypted using a session key created from OTP data. As another example, the preferred method of use of the QKD apparatus described in our above-mentioned co-pending UK patent application no. 0512929.6 involves use of OTP data for several purposes including for identity verification.

Since being able to replenish the OTP data is an important function of the device 10, it is desirable to ensure that there is always enough OTP data available to carry out a provisioning operation; in fact, preferably, there should be enough OTP data available to carry out several abortive attempts at provisioning as well as a successful provisioning operation. Accordingly, the OTP data 40 held in the OTP memory 13 is logically divided into two parts—a first part 41 to be used by the OTP consumption block 15 and a second part 42 reserved for use by the OTP provisioning block 14. An OTP data manager 45 of the memory 13 ensures that this division of utilization of the OTP data 40 is followed. The second part 42 of the OTP data 40 is, for example, located at the end of the OTP data 40; therefore if the above-described pad alignment mechanism is used by the provisioning block 14 when starting a provisioning operation with the complimentary OTP apparatus, all the OTP data in part 41 will be lost. This can be avoided by effectively treating the OTP data 40 as two one-time pads respectively formed by parts 41 and 42; these one-time pads are both replenished when a provisioning operation is carried out but a separate head index is used for each pad and pad alignment is carried out separately (pad 41 will undergo alignment when the OTP consumption block interacts with the complementary OTP apparatus, whereas pad 42 will undergo alignment when the OTP provisioning block interacts with the complementary OTP apparatus).

Preferably, the OTP data manager 45 is arranged to alert the device user via the user interface 11 when the level of the OTP data in the part/pad 41 falls below a predetermined threshold level 43.

Figure 5:
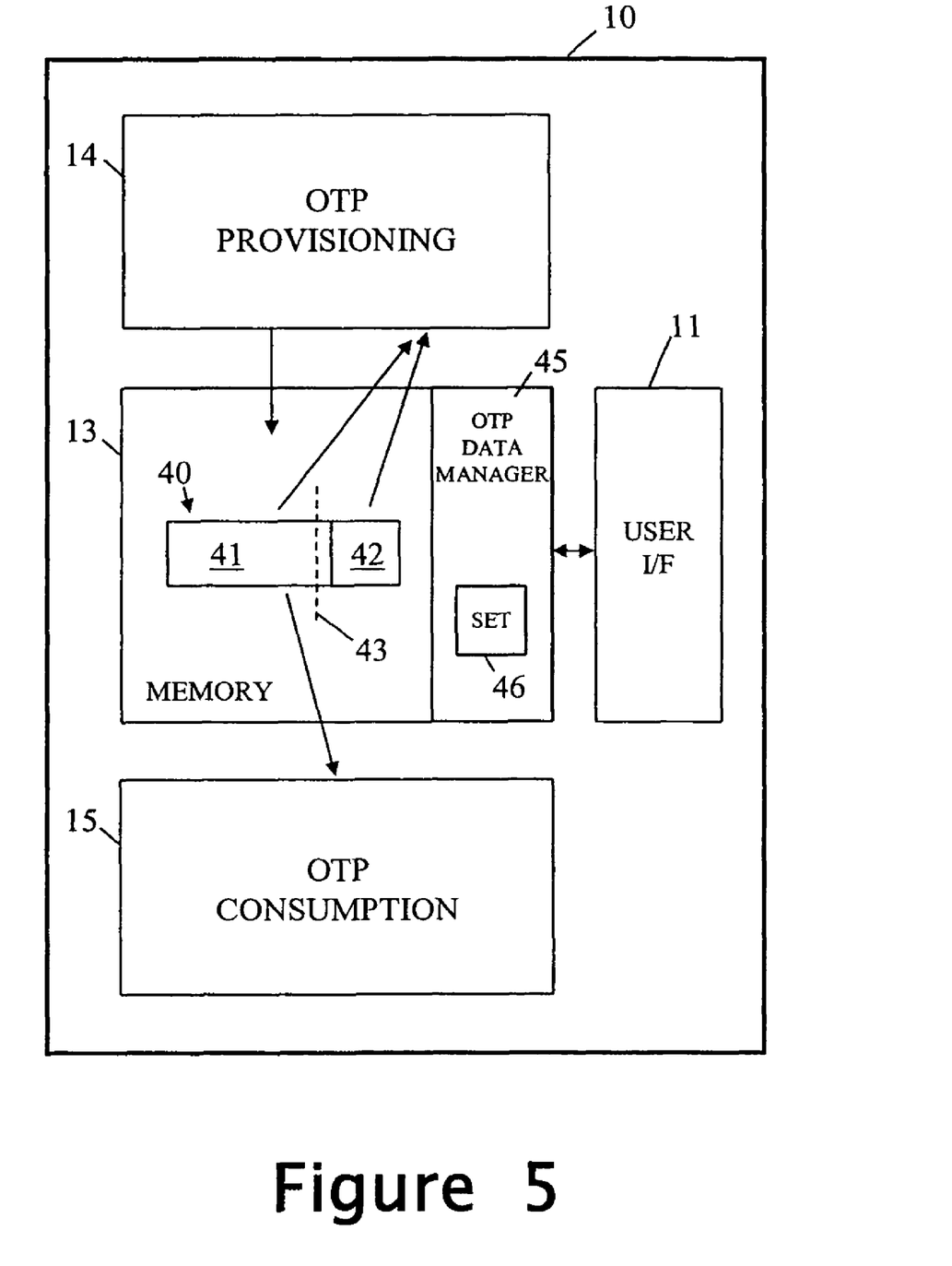
FIG. 5 is a diagram of a further implementation of the FIG. 1 device in which OTP data is reserved for carrying out a set of important tasks including OTP data replenishment.

FIG. 5 shows another form of the device 10 that reserves OTP data for use in the OTP replenishment process. Again, the OTP data 40 held in the device memory 13 is divided into two parts 41 and 42. However, this time OTP data manager 45 permits the OTP data part 41 to be used not only for security-related tasks carried out by the consumption block 15, but also for the OTP replenishment task carried out by the provisioning block 14. Furthermore, the OTP data manager 45 allows access to the OTP data part 42 not only to the OTP data replenishment task carried out by the OTP provisioning block 45, but also to any other task that is a member of a predetermined set 46 of important tasks.

The identities of the important tasks is specified by the device user via user interface 111 and includes, by default, the OTP replenishment task. Other candidates for the set of important tasks are, for example, an identity verification task required to be executed to allow the device user access to his/her home or workplace or to allow withdrawal of cash from an ATM.

The amount of data in the OTP data part 42 is dependent on the number and nature of the tasks in the set of important tasks; in this respect, where it is desired to be able to carry out an encryption or decryption task, it will be necessary for the user to specify the maximum message length to enable the correct amount of OTP data to be reserved. In fact, the user may want to have the assurance that they will be able to run an important task more than once; accordingly, the manager 45 is arranged to permitted the user to specify the number of usages that are to be possible for each important task (the default being one usage). This number of usages must, of course, be taken into account when determining the amount of data in the OTP data part 42. It is also necessary to take into account potential failures in attempting to execute each important task; preferably, this is done by tracking past failures when attempting each task and then estimating an appropriate safety margin that will normally be sufficient to ensure successful execution of each important task despite failed attempts.

In addition to, or as an alternative to, the user specifying which tasks are important, the manager 45 can automatically determine certain tasks to be important based on their frequency of past use.

The OTP data part 42 is allocated between the important tasks with a record of the remaining amount of OTP data available for each task being associated with the identity of that task in the set 46 by the manager 45.

During normal operation of the device 10, whenever a task is to be executed that consumes OTP data, the required OTP data is provided from the top of the OTP data part 41, regardless of whether the task is an important task in set 46 or a less important task. In due course, the level of data in the OTP data part 41 will fall below the level of a threshold 43 causing the user to be informed via the user interface 11 that replenishment of the OTP data is due. The user can be reminded by the manager (or can ask the manager to display information about) how the reserved data in OTP data part 42 is allocated between the important tasks—that is, the user may be informed that he/she can carry out one OTP replenishment task, two identity verification tasks, and one encryption task for a message of specified length x.

After the threshold 43 has been crossed, OTP data from important tasks is taken from the reserved OTP data part 42 (any remaining data in the OTP data part 41 is used for less important tasks until the data has been exhausted). Whenever OTP data from the OTP data part 42 is subsequently consumed in connection with an important task, the recorded amount of OTP data remaining for that task is reduced accordingly, regardless of whether or not the task was successfully executed. However, the manager 45 is preferably arranged to permit the user to enter an override to transfer data allocated to one important task to another important task that has run out of OTP data to use.

In due course, a replenishment task is executed and the OTP data 40 is replenished enabling normal operation to be resumed during which all tasks use data from the OTP data part 41.

Rather than allocating the data of OTP data part 42 between the important tasks of set 46, use of the reserved OTP data 42 can be on a first-come first served basis between the important tasks.

It will be appreciated that many variants are possible to the above described embodiments of the invention.

For example, it will be appreciated that the functionality of the OTP data manager 45 in the embodiments of the invention described above with reference to FIGS. 4 and 5, can generally be integrated into the operation of the provisioning and consumption blocks 14 and 15.

Furthermore, although the foregoing embodiments of the invention have been described in relation to an OTP device that incorporates, in a self-contained form, OTP storage, provisioning, and consumption, it is to be understood that the device could generally be replaced by a distributed arrangement of its functional blocks.

In order to reduce the need to effect re-provisioning of the OTP devices and OTP apparatus with secret random data, it is possible to arrange for devices to consume their one-time pad data more than once where the security requirements permit such a reduction in the level of security. Such "n-time" use of the OTP data does not change the character of the secret random data subject to distribution or of the resulting OTP data and the accompanying claims are to be understood accordingly.

The invention claimed is:

1. A method of managing one-time pad data stored in a device that is arranged to carry out one or more security-related tasks using said one-time pad data, the method comprising:
   receiving said one-time pad data at said device from a secure device other than a complementary device wherein said complementary device uses said one-time pad data for a secure communication with said device;
   controlling use of said one-time pad data held by said device such that an amount of this one-time pad data is only usable by an predetermined set of tasks, said predetermined set of tasks comprising at least a replenishment task;
   allocating a first part of said one-time pad data for use by one-time pad applications;
   allocating a second part of said one-time pad data for use by said replenishment task configured for replenishing said device with additional one-time pad data; and
   sharing secret random data during a communication where only secret random data is shared during said communication and only maximum level of security is used during said communication of the secret random data, which is used in provisioning said one-time pad data.

2. A method according to claim 1, further comprising:
   specifying, at least in part, said predetermined set of tasks by user input to said
   determining said amount of one-time pad data only usable by the set of tasks, in dependence on the number and nature of said tasks.

3. A method according to claim 2, further comprising enabling a user to specify multiple usages for said tasks, the said amount of one-time pad data only usable by the set of tasks being determined in dependence on the number of usages set for each of said tasks.

4. A method according to claim 2, wherein the said amount of one-time pad data only usable by the set of tasks is determined with a safety margin for failed attempts to execute said tasks.

5. A method according to claim 1, wherein, the second part constituting said amount of one-time pad data only usable by the set of tasks; execution of said tasks using one-time pad data from said first part until that part is substantially exhausted after which execution of said task uses one-time pad data from said second part.

6. A method according to claim 5, further comprising allocating said second part between the tasks such that each task, when using one-time pad data from said second part, can only use its own allocation of one-time pad data.

7. A method according to claim 6, further comprising a user entering an override to enable a task of said tasks, that has used its allocation of one-time pad data from said second part, to be executed by using one-time pad data allocated to a different task of said tasks.

8. A method according to claim 1, wherein the one-time pad data stored in the device comprises a first part and a second part, the second part constituting said amount of one-time pad data only usable by the set of tasks; the first and second parts being treated as separate one-time pads respectively for use by tasks outside said set of tasks, and for use by said set of tasks.

9. A device comprising:
   a processor for receiving one-time pad data from a secure device other than a complementary device wherein said complementary device uses said one-time pad data for a secure communication with said device;
   a memory for holding said one-time pad data, wherein said one-time pad data is allocated in a first part for use by one-time pad applications and a second part for use by a replenishment task,
   a consumption arrangement which uses said one-time pad data from said memory to carry out one or more security-related tasks;
   a provisioning arrangement which carries out said replenishment task configured to replenish said memory with additional one-time pad data, said replenishment task itself using of said one-time pad data from said memory,
   a one-time pad data manager which reserves an amount of said one-time pad data held in the memory for use by a set of tasks comprising at least said replenishment task; and a data-transfer interface configured for sharing secret random data during a communication where only secret random data is shared during said communication and only maximum level of security is used during said communication of the secret random data, which is used in provisioning said one-time pad data.

10. A device according to claim 9, further comprising a user interface for enabling a user to specify, at least in part, said predetermined set of tasks to the one-time pad data manager by user input; the one-time pad data manager being arranged to determine the said amount of one-time pad data only usable by the set of tasks, in dependence on the number and nature of said tasks.

11. A device according to claim 10, wherein the user interface is arranged to enable said user to specify to the one-time pad data manager, multiple usages for said tasks; the one-time pad data manager being further arranged to determine the said amount of one-time pad data only usable by the set of tasks, in dependence on the number of usages set for each of said tasks.

12. A device according to claim 10, wherein the one-time pad data manager is arranged to determine the said amount of one-time pad data only usable by the set of tasks, with a safety margin for failed attempts to execute said tasks.

13. A device according to claim 9, wherein the second part constituting said amount of one-time pad data only usable by the set of tasks; the one-time pad data manager being so arranged that execution of said tasks is effected using one-time pad data from said first part until that part is substantially exhausted after which execution of said tasks is effected using one-time pad data from said second part.

14. A device according to claim 9, wherein the one-time pad data manager is arranged to allocate said second part between the tasks such that each task, when using one-time pad data from said second part, can only use its own allocation of one-time pad data.

15. A device according to claim 14, further comprising a user interface for enabling a user to enter an override to the one-time pad data manager to cause the latter to enable a task of said tasks, that has used its allocation of one-time pad data from said second part, to be executed by using one-time pad data allocated to a different task of said tasks.

16. A device according to claim 9, wherein the one-time pad data manager is arranged to treat the one-time pad data as comprising a first one-time pad and a second one-time pad, the second one-time pad constituting said amount of one-time pad data only usable by the set of tasks; the one-time pad data manager being so arranged that execution of said task is effected using one-time pad data only from said second one-time pad and execution of other tasks is effected using one-time data only from the first one-time pad.

* * * * *

UNITED STATES PATENT AND TRADEMARK OFFICE
CERTIFICATE OF CORRECTION

| | | |
|---|---|---|
| PATENT NO. | : 8,050,411 B2 | Page 1 of 1 |
| APPLICATION NO. | : 11/489750 | |
| DATED | : November 1, 2011 | |
| INVENTOR(S) | : William John Munro et al. | |

It is certified that error appears in the above-identified patent and that said Letters Patent is hereby corrected as shown below:

In column 12, line 13, in Claim 2, after "said" insert -- device; and --.

In column 12, line 26, in Claim 5, delete "wherein," and insert -- wherein --, therefor.

Signed and Sealed this
Fourteenth Day of August, 2012

David J. Kappos
*Director of the United States Patent and Trademark Office*